March 7, 1961

E. S. DEHAVEN 2,973,936

CONTROL VALVE

Filed May 27, 1957

INVENTOR.
Eugene S. DeHaven
BY

Griswold & Burdick
ATTORNEYS

March 7, 1961  E. S. DEHAVEN  2,973,936
CONTROL VALVE

Filed May 27, 1957  3 Sheets-Sheet 2

INVENTOR.
Eugene S. DeHaven
BY
Griswold & Burdick
ATTORNEYS

March 7, 1961  E. S. DEHAVEN  2,973,936
CONTROL VALVE

Filed May 27, 1957  3 Sheets-Sheet 3

INVENTOR.
Eugene S. DeHaven
BY
Griswold & Burdick
ATTORNEYS

United States Patent Office 2,973,936
Patented Mar. 7, 1961

2,973,936

CONTROL VALVE

Eugene S. Dehaven, Walnut Creek, Calif., assignor to The Dow Chemical Company, Midland, Mich., a corporation of Delaware Filed May 27, 1957, Ser. No. 661,682

6 Claims. (Cl. 251—205)

It may frequently be desirable or necessary to accurately control the flow of liquid high polymer compositions, including polymers in solution and the like highly viscous liquids, during their handling and transfer for various purposes by valve means that have linear response characteristics. Quite often, it is advantageous to effect such control by means of and through motor operated valve units. Unfortunately, however, the standard and conventionally designed control valves that are available are not well suited for satisfactory employment in such service. The standard valves are generally intended for utilization with liquids that are moving in turbulent flow. Consequently, when they are employed with viscous liquids, they exhibit an approximately "on-off" behaviorism due to their particular structural characteristics. Thus, they generally fail to provide suitable control proportional to their setting when they are used to handle the indicated varieties of viscous liquids.

The chief aim and concern of the present invention is to provide an improved control valve particularly adapted for the handling of high polymer compositions and the like viscous liquids that would be capable of proportionally regulating the flow of the liquid according to the valve setting and which would be especially well suited for installation and use in and with standard proportional-motor, valve-operating units.

To the attainment of the indicated and corollary ends, a control valve in accordance with the present invention is most advantageously comprised essentially of means defining a body having a central, cylindrical, well-like cavity therein and formed with inlet and outlet ports leading into and out of the central portion of said cavity in a path across said body that is substantially perpendicular to the axis of said cavity; a concentric, cylindrical, stem or plunger positioned coaxially in said cavity and extending out of said body; said stem adapted to be moved longitudinally in said cavity and relatively into and out of said body to provide closed and open settings, respectively, and settings intermediate thereof for said valve, said stem forming a divided channel in said cavity that proceeds arcuately around each side of said stem through said cavity for the flow of liquid from said inlet to said outlet port when said valve is set to an open position; an annular seat in said cavity about said stem; a protuberant cylindrical plug on said stem positioned intermediately thereon, said plug conforming to said cavity and being slidably and sealingly engageable with said body in said cavity, said plug being adapted to restrict said channel when said stem is moved inwardly into said valve body and to finally engage said seat at the end of said inward movement of said stem when said valve is closed thereby against flow of liquid therethrough. As is apparent, the well-like cavity, the stem and the plug are not necessarily restricted to having cylindrical configurations although it is preferable for them to be so shaped. However, if it is desired, they may also have relatively square or other geometrically characterizable varieties of cross-sections. Beneficially, passage means are provided in the valve to accommodate the escape or entrance from and into the cavity above and below the plunger or stem plug as required by changes in the setting of the valve.

Advantageously, the valve is designed so that the flow rate, Q, of the liquid passing in viscous flow therethrough, especially with the valve in wide open position, is according to the formula:

$$Q = 2\left(\frac{bPY^3}{12zL}\right)\left(1+\frac{3}{20}C\left[\frac{PY}{L}\right]^2\right)\left(1-0.63\frac{Y}{b}\right)$$

wherein $b$ is the width of the channel as measured parallel to the cylindrical axis of the cavity; P is the pressure drop of the liquid across the valve; Y is the total clearance of the divided channel, i.e., the entire open distance adjacent both sides of the stem in a direction perpendicular to the axis of the cavity; $z$ is the zero-shear viscosity of the viscous liquid being handled (as may be determined by conventional tests, such as with Brookfield viscosity measuring apparatus, in which various readings taken at different rates of rotation or shear values are extrapolated to zero-shear); L is the length of the channel between the inlet and outlet ports of the valve; and C is the pseudoplasticity constant of the viscous liquid when it is a non-Newtonian fluid, which constant is zero in the ideal case of a true Newtonian viscous fluid. Obviously, consistent units are employed in the foregoing relationship, regardless of whether the measures are made according to the English or metric systems.

As is understood by those who are skilled in the art, the pseudoplasticity of a liquid is an indication of the departure in the behaviorism of the liquid from that which characterizes Newtonian fluids. To illustrate, a pseudoplastic fluid will decrease in consistency (apparent viscosity) as the rate of shear (velocity gradient) that is applied to it increases, whereas in a Newtonian fluid the consistency is independent of rate of shear. Usually, a pseudoplastic fluid is found to approach a lower consistency as a limit, as indicated in the relationship that is graphically portrayed in Figure 1 of the accompanying drawing. The pseudoplasticity constant of a viscous liquid which, in the English system, is expressed in units of feet to the fourth power per pounds of force squared, is an empirical value that may ordinarily be evaluated by solution of the following equation for "C" after the values for the other variables have been determined by observation and measurement of the viscous flow of a given pseudoplastic liquid in a given tube:

$$Q = \frac{piD^4P}{128zL}\left[1+\frac{2}{3}C\left(\frac{DP}{4L}\right)^2\right]$$

wherein, in consistent units, D is the diameter of the tube; P is the pressure difference across the tube; L is the length of the tube; $z$ is the zero-shear viscosity of the liquid; and Q is the flow rate.

Valves in accordance with the present invention can be made to have relatively simple structural features and to provide exceptional satisfactory characteristics as flow controlling instruments for viscous fluids. The valves have true linear response characteristics, i.e., for example, at a 10 percent open setting they permit 10 percent of the maximum possible flow of which they are capable of handling. Furthermore, they retain such characteristics over any pressure drop since the term $$\frac{PY}{L}$$

remains constant. This is highly desirable for idealized control systems. They are unusually well suited for utilization with motor proportioning units for their operation. The valves are generally unhampered by such operational difficulties as air leakage and can be fabricated from either metallic or non-metallic corrosion-resisting materials of construction, especially those of an easily machinable nature. The valves are relatively inexpensive to manufacture and compare quite favorably in this regard with the standard control valves that are available for handling liquids in turbulent flow. They may be utilized with great advantage for the flow control and throttling of practically any viscous liquid which, without handicap, may be a pseudoplastic fluid, especially viscous liquid polymer compositions, particularly where an absolutely tight shut off is not an essential requirement.

Further features and advantages of the valves of the present invention will be manifest in the ensuing description and specification, taken in connection with the several views of the accompanying drawing, additional to the already-mentioned Figure 1, which illustrate one embodiment of the invention and in which like reference numerals refer to like parts, wherein;

Figure 2, partly in section, is a perspective view of a control valve according to the invention;

Figure 3 is a plan view of the valve;

Figure 4, taken partly in section along the line 4—4 in Figure 3, is a front elevation of the valve;

Figure 2:
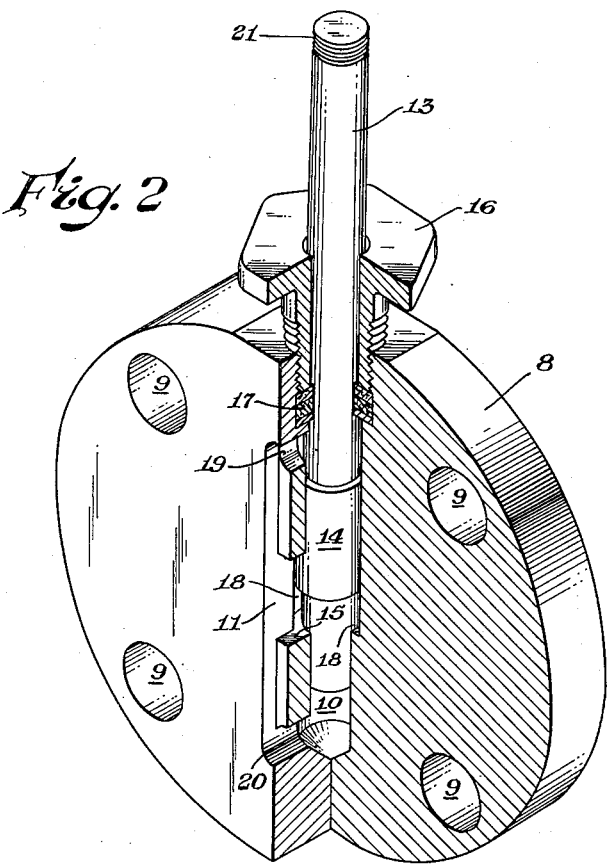
Figure 1:
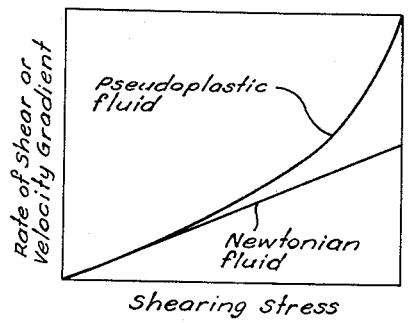
Figure 3:
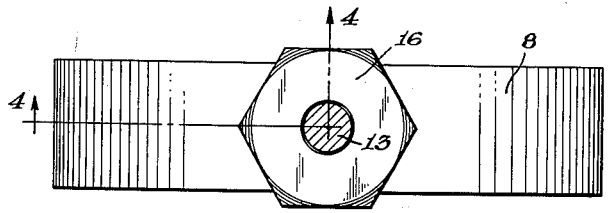
Figure 4:
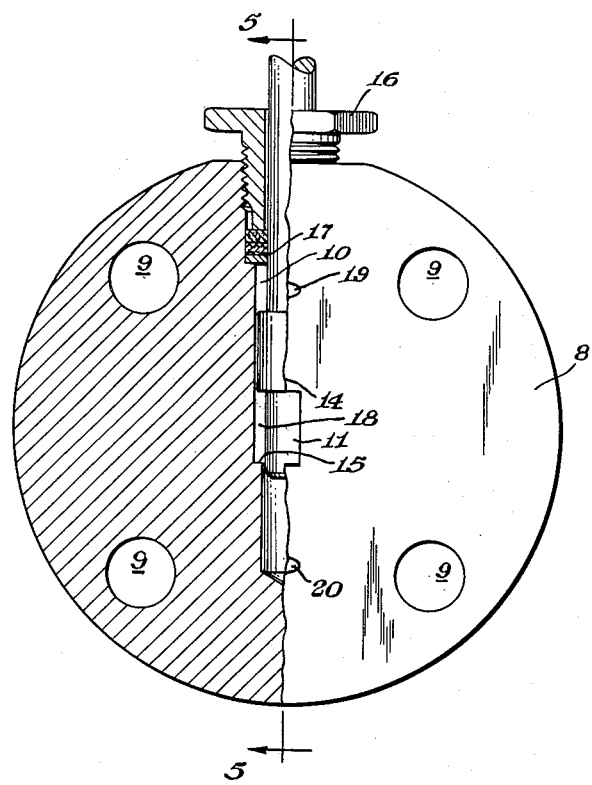
Figure 5:
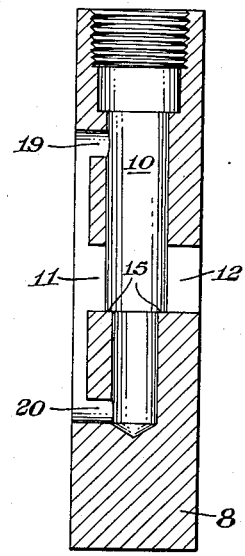
Figure 5 is a sectional side elevation of the valve taken along the line 5—5 in Figure 4, with the stem removed from the valve.

The valve consists of a body 8 that, advantageously, may have a flat, circular, disc-like configuration with a plurality of apertures 9 drilled transversely therethrough to facilitate mounting. Of course, other body configurations can also be employed. A central, cylindrical, well-like cavity 10 is formed in the valve body 8. An inlet port 11 and an outlet port 12 lead into and out of the mid portion of the cavity in a path through the body that is perpendicular to the longitudinal axis of the cavity 10. A cylindrical plunger or stem 13 is provided in the cavity 10 and is movable in and out of the valve body in an up and down manner when the valve is mounted in an upright position. A protuberant plug 14 is provided in a fixed manner intermediately about the stem. The plug 14 fits closely against the valve body 8 within the mid part of the cavity 10 having a piston-like relationship therein. Downward movement of the stem 13 causes the plug 14 to close the opening in the valve between the inlet and outlet ports 11, 12, respectively. As shown in Figure 2, the valve is in about a half open position. In Figure 4 it is about wide open. Advantageously, the bottom portion of the cavity 10 is necked down to provide stem-accommodating clearances for receiving the lowermost part of the stem 13 and forming an annular shoulder or seat 15 for the plug 14 to circumferentially engage and seal upon when the valve is closed. The upper portion of the cavity 10 may beneficially be countersunk and tapped, as is illustrated. This permits a hollow packing gland nut 16 to be threaded into the cavity 10 to centrally position the stem 13 therein and to allow suitable gasketing or packing material 17 to be provided between the valve body 8 and the stem 13 for sealing purposes. Of course, the stem is slidable up and down through the packing gland 16 to obtain desired valve settings.

Figure 7:
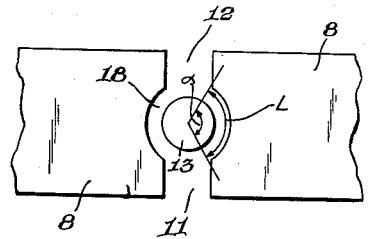
Figure 7 is a schematic representation of the flow channel through the valve between the inlet and outlet ports for the liquid being handled.
Figure 6:
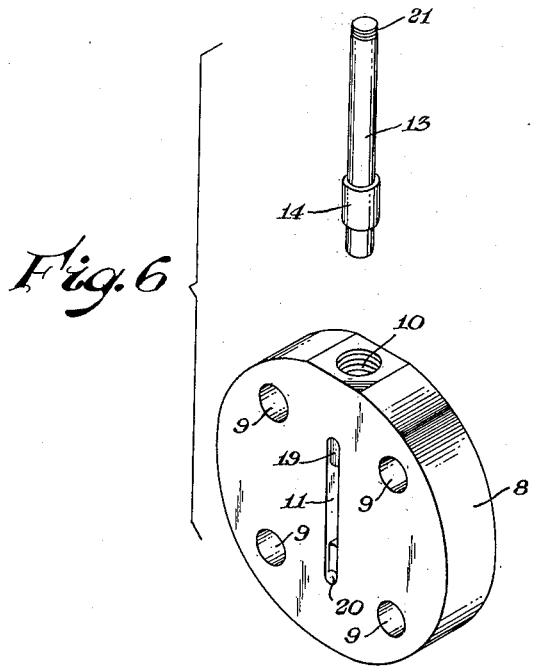
Figure 6 is an exploded perspective view of the valve with the plunger stem removed from the body.

When the stem 13 is moved out of the valve body 8 to lift the plug portion 14 from the seat 15, a divided channel 18 is formed on both sides of the stem 13 in the uniformly thick spaces between the concentric stem 13 and cavity walls of the valve body 8. The channel 18 leads through the valve body between the inlet port 11 and the outlet port 12. Each portion of the channel 18 is arcuate and has a constant clearance therethrough that is analogous to the clearance between parallel plates and a uniform width that is determined by the distance between the bottom of the plug 14 and the seat 15. As is depicted in Figure 7, the length "L" of the channel 18 can be determined by measurement of the length of the arc between the inlet and outlet ports 11, 12 as confined within the angle $\alpha$ illustrated in the drawing. Thus, if the diameter of a given stem 13 is 0.405 inch, the diameter of a given cavity 10 concentric with the stem is 0.500 inch and the angle "$\alpha$" (which includes the arc between the inlet and outlet ports 11, 12) is 120°, the length L of the channel 18 may be determined according to the calculation:

$$L = \left(\frac{120}{360}\right)(pi)\left(\frac{0.500 + 0.405}{2}\right) = 0.474 \text{ inch}$$

In order to avoid binding of the valve during changes in its setting, it is advantageous to provide relief passageways communicating between the inlet port 11 and the upper and lower portions of the cavity 10. Thus an upper relief passageway 19 leads from the inlet port 11 to the cavity 10 to a point above the uppermost position of the plug 14 when the valve is wide open. A lower relief passageway 20 leads similarly to the lowermost portion of the cavity 10 below the seating position of the plug 14 on the annular shoulder seat 15. These passageways 19 and 20, as is apparent, allow liquid in the valve to escape from or enter the cavity 10 above or below the plug 14 in order to accommodate flow controlling movements of the assembly. The uppermost portion of the stem 13 extending from the valve body 8 above the packing gland 16 may be provided with threads 21 to facilitate connection with an actuating motor or other motivating means (not shown) for the valve, such as lever linkage or the like.

A valve in accordance with the present invention similar to that depicted in the drawing was utilized with eminent satisfaction for considerable periods of time in a flow-proportioning, motor-controlled unit to regulate a stream of a viscous liquid having a viscosity at 65° C. (the temperature at which it was handled) of between 300 and 500 poise. It had a zero-shear viscosity of about $2.76 \times 10^{-4}$ pound-hours per square foot and a pseudoplasticity constant of about $2.4 \times 10^{-4}$ feet to the fourth power per pound-foot squared. The liquid consisted of a solution of polyacrylonitrile that was dissolved in an aqueous zinc chloride solvent. The pressure at the inlet was equivalent to about a two feet head of the polymer solution and that at the outlet about 50 millimeters of mercury, absolute. The pressure drop across the valve, therefore was about 2,160 pounds of force per square foot or 15 pounds per square inch. The width of the channel, taken parallel with the axis of the cavity between the bottom of the plug and the seat was about ⅝ of an inch (0.0521 foot). Its total clearance, uniform between both sides of the stem across to the adjacent side walls of the cavity was 0.048 inch (0.004 foot). The arcuate channel length (identical with that derived in the foregoing illustrative calculation) was 0.474 inch (0.0395 foot). The flow rate of the valve in wide open position was found to be substantially equal in operation to that which could be calculated for with the above data using the design formula herein set forth as characteristic of the valve. This maximum flow rate was about 0.278 cubic foot (roughly two gallons) per hour.

It is to be fully understood that many other embodiments of the valve of the present invention can be made besides that which is illustrated without substantially departing from the spirit and scope of the invention as it is particularly set forth and defined in the hereto appended claims.

What is claimed is:

1. In a control valve for liquids in viscous flow, means defining a body having a central, well-like cavity therein and formed with inlet and outlet ports leading into and out of the central portion of said cavity in a path across said body that is substantially perpendicular to the central axis of said cavity; a concentric plunger stem positioned coaxially in said cavity and extending out of said body, said stem adapted to be moved longitudinally in said cavity and relatively into and out of said body to provide closed and open settings, respectively, for said valve, said stem forming a divided channel in said cavity that proceeds around each side of said stem through said cavity for the flow of liquid from said inlet to said outlet port when said valve is set to an open position; a seat in said cavity about said stem, said seat being in alignment with both the inlet and outlet ports and having its surface in a direction substantially transverse to the central axis of said cavity; a plug on said stem positioned intermediately thereon, said plug conforming to said cavity and being slidably and sealingly engageable with said body in said cavity; and having a transverse end surface to engage said seat said plug being adapted to restrict said channel when said stem is moved inwardly into said valve body so as to regulate the flow of said viscous liquid at a rate between the flow under any given pressure with the valve at wide open position and at cut-off in direct linear proportion to the setting of the valve and to finally engage said seat at the end of said inward movement of said stem when said valve is closed thereby against the flow of liquid therethrough.

2. In a control valve for liquids in viscous flow, means defining a body having a central, cylindrical, well-like cavity therein and formed with inlet and outlet ports leading into and out of the central portion of said cavity in a path across said body that is substantially perpendicular to the central cylindrical axis of said cavity; a concentric cylindrical plunger stem positioned coaxially in said cavity and extending out of said body, said stem adapted to be moved longitudinally in said cavity and relatively into and out of said body to provide closed and open settings, respectively, for said valve, said stem forming a divided channel in said cavity that proceeds arcuately around each side of said stem through said cavity for the flow of liquid from said inlet to said outlet port when said valve is set to an open position, said seat being in alignment with both the inlet and outlet ports and having its surface in a direction substantially transverse to the central axis of said cavity; an annular seat in said cavity about said stem; a protuberant cylindrical plug on said stem positioned intermediately thereon said plug conforming to said cavity and being slidably and sealingly engageable with said body in said cavity; and having a transverse end surface to engage said seat said plug being adapted to restrict said channel when said stem is moved inwardly into said valve body so as to regulate the flow of said viscous liquid at a rate between the flow under any given pressure with the valve at wide open position and at cut-off in direct linear proportion to the setting of the valve and to finally engage said seat at the end of said inward movement of said stem when said valve is closed thereby against the flow of liquid therethrough.

3. In combination with and in addition to the apparatus of claim 2, partitioning walls in the inlet in said body, said partitioning walls separating said cavity from said inlet and in which walls there are relief passageways formed to communicate between said cavity and said inlet port above and below said plug therein.

4. In combination with and in addition to the apparatus of claim 2, packing means between said valve body and said stem in the upper portion of said cavity.

5. A valve according to claim 2 having a relatively flat body.

6. In a control valve for liquids in viscous flow which is adapted to pass said liquids, under any given pressure, at a rate between the flow with the valve at wide open position and at cut-off in direct linear proportion to the setting of the valve wherein the flow rate Q when said valve is in wide open position is determinable according to the expression:

$$Q = 2\frac{(bPY^3)}{12zL}\left(1 + \frac{3}{20}C\left[\frac{PY}{L}\right]^2\right)\left(1 - 0.63\frac{Y}{b}\right)$$

wherein, in consistent units of measure, $b$ is the width of the channel taken parallel to the cylindrical axis of the cavity in the valve body; $P$ is the pressure drop of the liquid across the valve; $Y$ is the total clearance of the channel across the cavity; $z$ is the zero-shear viscosity of the liquid being handled; $L$ is the length of the channel; $C$ is the pseudoplasticity constant of the liquid being handled; means defining a body having a central, well-like cavity therein and formed with inlet and outlet ports leading into and out of the central portion of said cavity in a path across said body that is substantially perpendicular to the central axis of said cavity; a concentric plunger stem positioned coaxially in said cavity and extending out of said body, said stem adapted to be moved longitudinally in said cavity and relatively into and out of said body to provide closed and open settings, respectively, for said valve, said stem forming a divided channel in said cavity that proceeds around each side of said stem through said cavity for the flow of liquid from said inlet to said outlet port when said valve is set to an open position, said channel having a width $b$ parallel to the cylindrical axis of the cavity and a total clearance $Y$ across said cavity; a seat in said cavity about said stem, said seat being in alignment with both the inlet and outlet ports and having its surface in a direction substantially transverse to the central axis of said cavity; a plug on said stem positioned intermediately thereon, said plug conforming to said cavity and being slidably and sealingly engageable with said body in said cavity; and having a transverse end surface to engage said seat said plug being adapted to restrict said channel when said stem is moved inwardly into said valve body so as to linearly regulate the flow of said viscous liquid in direct proportion to the setting of the valve and to finally engage said seat at the end of said inward movement of said stem when said valve is closed thereby against the flow of liquid therethrough.

References Cited in the file of this patent

UNITED STATES PATENTS

| | | |
|---|---|---|
| 711,121 | Porter | Oct. 14, 1902 |
| 859,441 | Erwood | July 9, 1907 |
| 1,523,239 | Sweeney | Jan. 13, 1925 |
| 1,695,536 | Crowley | Dec. 18, 1928 |
| 2,722,401 | Till et al. | Nov. 1, 1955 |
| 2,744,775 | Bredtschneider | May 8, 1956 |
| 2,796,074 | Daudelin | June 18, 1957 |